United States Patent
De Anna et al.

(10) Patent No.: US 8,933,641 B2
(45) Date of Patent: Jan. 13, 2015

(54) POWER SUPPLY DEVICE HAVING AN AUXILIARY SUPPLY SOURCE FOR CONTROL CIRCUITRY

(75) Inventors: Paolo De Anna, Vallà di Riese Pio X (IT); Daniele Luccato, Vittorio Veneto (IT)

(73) Assignee: Osram AG, Munich (DE)

( * ) Notice: Subject to any disclaimer, the term of this patent is extended or adjusted under 35 U.S.C. 154(b) by 175 days.

(21) Appl. No.: 13/346,789

(22) Filed: Jan. 10, 2012

(65) Prior Publication Data

US 2012/0176058 A1   Jul. 12, 2012

(30) Foreign Application Priority Data

Jan. 11, 2011   (IT) ................. TO2011A0004

(51) Int. Cl.
  *G05F 1/00*     (2006.01)
  *H02M 3/07*     (2006.01)
  *H02M 3/335*    (2006.01)
  *H02M 1/00*     (2006.01)

(52) U.S. Cl.
  CPC ............... *H02M 3/07* (2013.01); *H02M 3/335* (2013.01); *H02M 2001/0006* (2013.01)
  USPC ........ 315/291; 315/209 R; 315/219; 315/149; 315/150; 315/308

(58) Field of Classification Search
  CPC ........... H05B 33/0815; H05B 33/0851; H05B 41/2881; H05B 41/295; H05B 37/02; H02M 3/33507; F21S 8/081; Y02B 20/346
  USPC ............. 315/291, 209 R, 219, 149, 150, 308
  See application file for complete search history.

(56) References Cited

U.S. PATENT DOCUMENTS

| | | | |
|---|---|---|---|
| 8,212,493 B2 * | 7/2012 | Melanson et al. | ............ 315/247 |
| 2002/0196642 A1 | 12/2002 | Goder et al. | |
| 2005/0259453 A1 | 11/2005 | Weng | |
| 2007/0040516 A1 * | 2/2007 | Chen | ............................. 315/291 |
| 2007/0210774 A1 | 9/2007 | Kimura et al. | |
| 2010/0327765 A1 * | 12/2010 | Melanson et al. | ............ 315/291 |

FOREIGN PATENT DOCUMENTS

WO   2009004563 A1   1/2009

* cited by examiner

*Primary Examiner* — Douglas W Owens
*Assistant Examiner* — Borna Alaeddini

(57) ABSTRACT

An electrical supply device may include a transformer with a secondary winding to feed a current to a load; control circuitry for the device; an auxiliary supply source for said control circuitry. The auxiliary supply source may include an output capacitor across which a supply voltage is provided for said control circuitry; at least one charge accumulation capacitor to be traversed by the current fed to said load; a comparator sensitive to the voltage on said at least one charge accumulation capacitor; and a switch interposed between said at least one charge accumulation capacitor and said output capacitor, said switch coupled to said comparator, whereby when the voltage on said at least one charge accumulation capacitor reaches a reference level, said switch couples said at least one charge accumulation capacitor to said output capacitor by transferring onto said output capacitor the charge on said at least one charge accumulation capacitor.

9 Claims, 4 Drawing Sheets

POWER SUPPLY DEVICE HAVING AN AUXILIARY SUPPLY SOURCE FOR CONTROL CIRCUITRY

CROSS-REFERENCE TO RELATED APPLICATION

This application claims priority to Italian Patent Application Serial No. TO2011A000004, which was filed Jan. 11, 2011, and is incorporated herein by reference in its entirety.

TECHNICAL FIELD

The present disclosure relates to electrical power supply devices.

BACKGROUND

In various embodiments, the description may refer to power supply devices adapted to be used, for example, together with light sources, such as LED light sources.

FIG. 1 in the annexed drawings shows, by way of a reference example, the design of a power supply device of the switching type.

The device in FIG. 1, denoted on the whole by 10, allows to supply, from a mains alternating voltage AC IN, for example 220V/50 Hz or 110V/60 Hz, a load L comprised for example of one or several LEDs (for example a so-called LED "string" adapted be used as a source of lighting radiation).

Device 10 is built around a transformer T, comprising a primary winding T1 and a secondary winding T2.

Primary winding T1 identifies the "primary" side of device 10, which substantially comprises a rectifier 12, a stabilizing network 14 and at least an electronic switch 16 (e.g. a mosfet) adapted to be alternately switched on and off on the basis of a control signal supplied by a controller 18.

On the secondary side of device 10 (which is therefore isolated from the primary side), beside the "main" secondary winding T2, adapted to supply load L, an auxiliary secondary winding denoted by 20 may be provided, which is adapted to supply circuitry components, such as logic circuits 22 and 24 which ensure the supply to the logic that controls the operation of device 10 (primarily through controller 18).

The exemplary embodiment shown in FIG. 1 has circuits 22 and 24 coupled to each other through an optocoupler (opto-isolator) 26a, 26b, so as to ensure, for the control signal as well, the galvanic isolation of both parts of device 10, that relate respectively to primary winding T1 and to secondary winding T2 of the transformer.

The diagram in FIG. 1 has a merely exemplary function, and it merely aims at introducing in general a possible circuitry design which may be subjected to the phenomena better detailed in the following.

The scope of the present invention, and in particular the various embodiments, are therefore in no way limited to the specific circuit arrangement of FIG. 1, which basically is shown again in the diagram of FIG. 4, as will be explained in the following.

In a device such as shown in FIG. 1, it may be crucial to ensure that the supply function to circuits 22, 24 has a stable voltage level.

This is done for example, when load L varies, by preventing changes (for example in voltage) in circuits 22 and 24 that may cause an improper operation of circuit 10.

This is true regardless of the specific circuit topologies shown in FIG. 1. In this respect it will be appreciated that several of the elements, denoted in the figure by the usual symbols indicating electrical components, have not been described in detail: this choice aims at highlighting that, for the purpose of implementing the embodiments, the particular circuit solutions shown may be replaced by functionally equivalent solutions, which are well-known to an expert in the field.

This is substantially true for FIG. 2 and FIG. 3 as well, which show block diagrams that, on the basis of the inventors' observations, could be used to ensure a stable supply for circuits 22 and 24 even if load L changes.

For example, the diagram in FIG. 2 shows the possibility to add a linear regulator 20a to auxiliary winding 20 already shown in FIG. 1.

This solution has the drawback of an extremely low efficiency: linear regulator 20a must be able to face voltage steps across secondary winding 20a and the corresponding multiplication factors of auxiliary current.

Another intrinsic drawback of the arrangement in FIG. 2 is that, because of the fixed coupling of both secondary windings T2 and 20, when the voltage across secondary winding T2 drops, the voltage across auxiliary secondary winding 20 can reach very low levels, below the minimum value needed to supply auxiliary logic 22, 24.

Such a problem may arise in the presence of loads comprised of LED light sources L. In particular, we refer to LED "strings", i.e. loads with a constant power consumption in spite of a possible change of the output voltage, due to a change of the number of active LEDs within the string, e.g. because one or several such LEDs are shunted, i.e. virtually short-circuited, in order to vary the brightness of the light source.

In the presence of a lower number of active LEDs, auxiliary circuit 20, 20a is no longer able to yield a sufficient voltage to supply secondary logic 22, 24.

The inventors have observed that, as is schematically shown in FIG. 3, another option would be to arrange a buck converter at the main secondary winding T2, while feeding the supply voltage for logic 22, 24 across a charged capacitor 23, according to the typical arrangement of a buck converter, through an inductor 25 connected to secondary winding T2 via an electronic switch such as a metal oxide semiconductor field effect transistor (MOSFET) 27, with reference 29 denoting the diode for recirculating the current through inductor 25 (and capacitor 23) when switch 27 is closed.

When mosfet 27 is on (i.e., conductive), such an arrangement of a buck converter feeds the load and charges inductor 25, while in the "off" stage, i.e., when mosfet 27 is non-conducting or open, current recirculates in the load and in diode 29.

The solution considered in FIG. 3 has the advantage of a good efficiency. This advantage, however, is diminished by the presence of a rather high number of components (with a consequent increase in costs) and by the need, in the case of a high voltage output, of a rather costly electronic switch, such as a mosfet 27.

The solution considered in FIG. 3 can also show operation problems with low values of output voltage. Actually, in such conditions, the buck circuit which lowers the voltage cannot work, because the supply voltage, i.e. the output voltage, is lower than the voltage needed for the auxiliary supply.

SUMMARY

In various embodiments, an electrical supply device may include a transformer with a secondary winding to feed a current to a load; control circuitry for the device; an auxiliary supply source for said control circuitry. The auxiliary supply source may include at least one output capacitor across which a supply voltage is provided for said control circuitry; at least one charge accumulation capacitor to be traversed by the current fed to said load; a comparator sensitive to the voltage on said at least one charge accumulation capacitor; and a switch interposed between said at least one charge accumulation capacitor and said output capacitor, said switch coupled to said comparator, whereby when the voltage on said at least one charge accumulation capacitor reaches a reference level, said switch couples said at least one charge accumulation capacitor to said output capacitor by transferring onto said output capacitor the charge on said at least one charge accumulation capacitor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
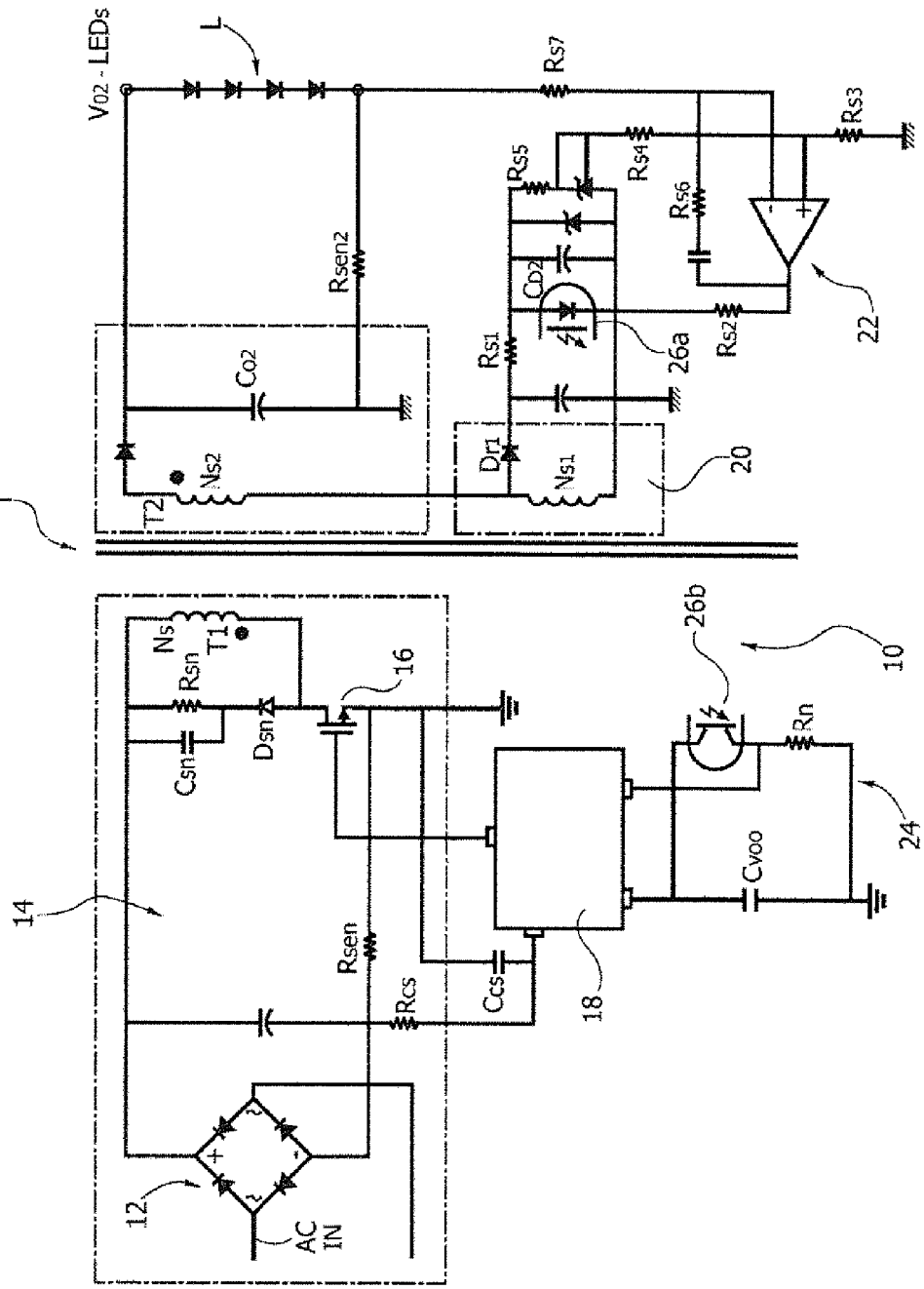
FIGS. 1 to 3 have already been described in the foregoing.
Figure 2:
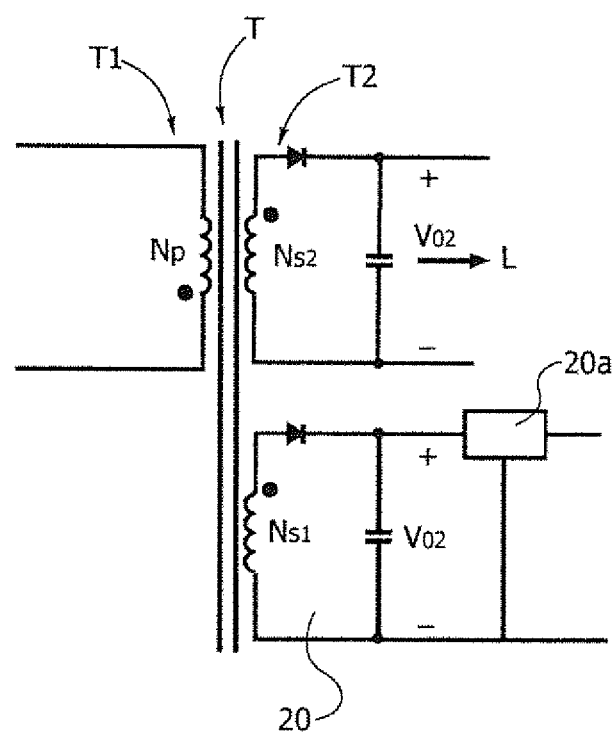
Figure 3:
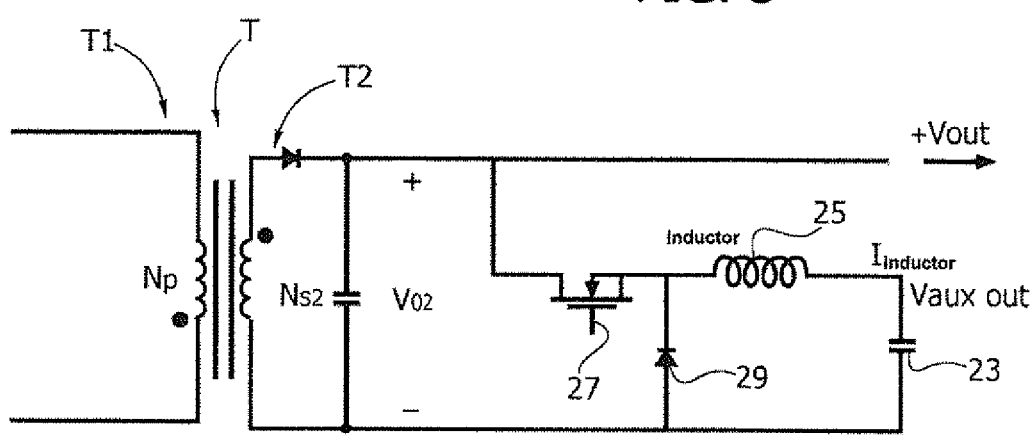

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments propose a solution to the drawbacks of the previously outlined arrangements.

An electrical supply device may include a transformer with a secondary winding to feed a current to a load; control circuitry for the device; an auxiliary supply source for said control circuitry. The auxiliary supply source may include an output capacitor across which a supply voltage is provided for said control circuitry; at least one charge accumulation capacitor to be traversed by the current fed to said load; a comparator sensitive to the voltage on said at least one charge accumulation capacitor; and a switch interposed between said at least one charge accumulation capacitor and said output capacitor, said switch coupled to said comparator, whereby when the voltage on said at least one charge accumulation capacitor reaches a reference level, said switch couples said at least one charge accumulation capacitor to said output capacitor by transferring onto said output capacitor the charge on said at least one charge accumulation capacitor.

In various embodiments, an auxiliary supply source is provided having a regulated voltage also in the presence of different load situations.

In various embodiments, the output voltage may vary (for example, in the case of LED light sources, as a consequence of varying the number of LEDs that make up a lighting string), while preserving the correct operation of the auxiliary supply network.

In various embodiments, the auxiliary voltage does not change in the presence of a short circuit, because the circuit operates properly even when it is traversed by a current.

Various embodiments may be more efficient than conventional solutions because of the absence of a voltage drop, as it is the case in linear regulators, and of the absence of a high switching frequency, as it is the case in buck converters.

In various embodiments, a simple and inexpensive circuit is obtained, made up of a small number of components that can operate at low voltage.

Figure 4:
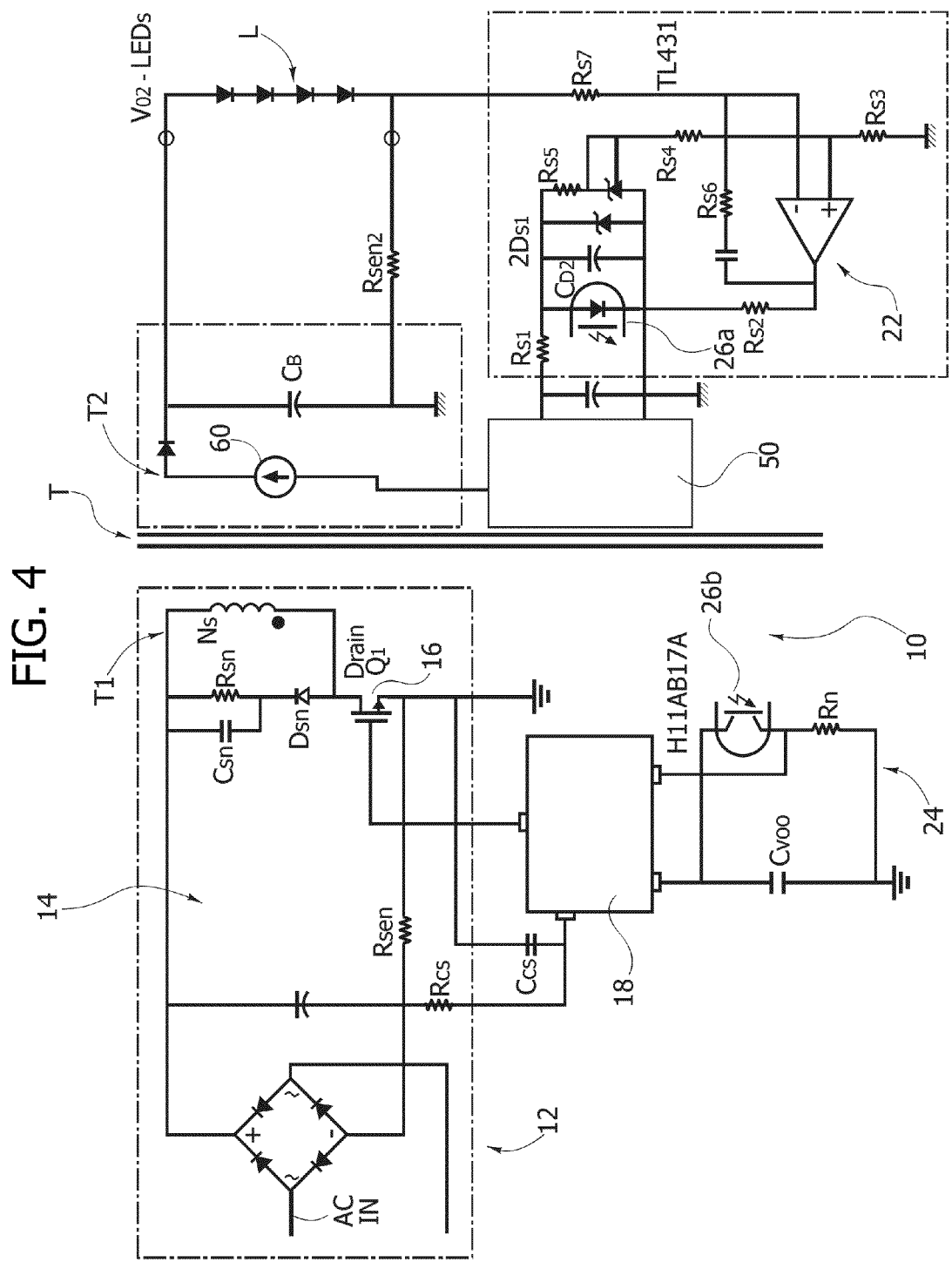
FIG. 4 is a block diagram of an embodiment.

The diagram in FIG. 4 essentially reproduces the diagram of previously described FIG. 1. Therefore, parts, elements and components identical or equivalent to those described with reference to FIG. 1 are denoted in FIG. 4 by the same references, and will not be described in detail in the following. However, the entire description of FIG. 1 will be incorporated as a description of an embodiment.

Referring to FIG. 4 we refer once again what has already been said in connection with FIG. 1.

Both diagrams of FIG. 1 and FIG. 4 must be considered as representative, in general, of a switching supply device including a transformer T with a primary winding T1, connected to the mains supply voltage (AC IN) and a secondary winding T2, to which in use a load L is connected which includes, for example, a light emitting diode (LED) string.

The specific implementation details at the circuitry level are therefore neither relevant nor compulsory for the practice of the embodiments.

Substantially, as has already been said, whatever the specific topology of device 10, the purpose is to generate, within the "secondary" portion of the device, an auxiliary supply voltage which can be used to supply circuits (here exemplified by logic 22, 24) adapted to ensure the control of device 10. The goal is to achieve an auxiliary supply voltage which is overall stable, regardless of any variation of load L.

In the following it will be assumed that said auxiliary supply voltage is made available across a capacitor denoted by Cp (see the diagrams in FIG. 5 and FIG. 6), in view of its possible use by a load R12 (FIG. 5 and FIG. 6), which in various embodiments can have the structure shown in FIG. 4. Once again it is to be reminded that such a design is merely exemplary, and is not compulsory in any way.

Figure 5:
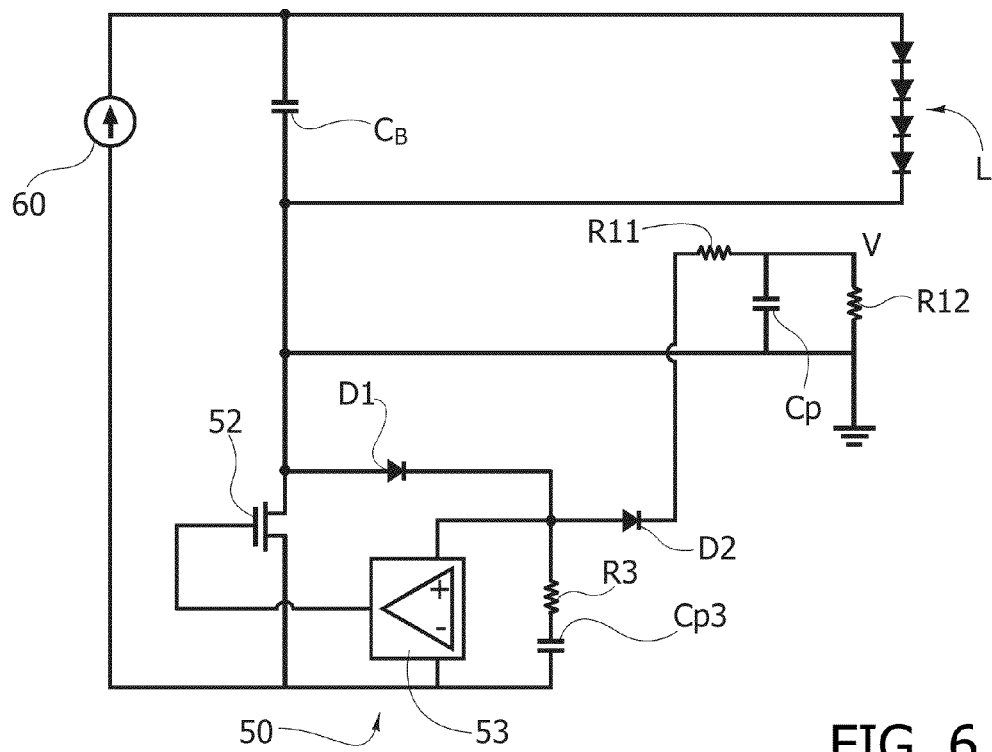
FIGS. 5 and 6 show implementation details of embodiments.
Figure 6:
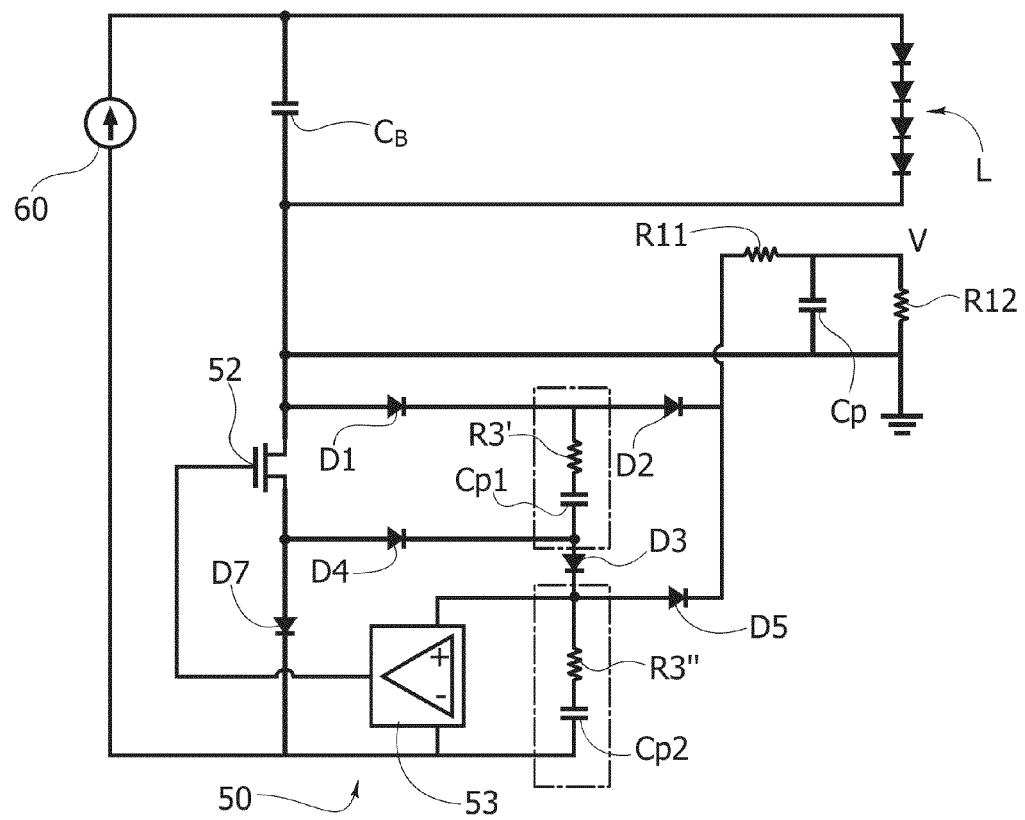

In the present description it has been assumed that said auxiliary supply voltage is derived via a circuit, on the whole denoted by 50, which can be considered as being connected to current generator 60, ideally comprised of secondary winding T2 and of the circuits associated therewith, so as to supply load L with a stabilized current value (whatever the specific embodiment adopted for the purpose among those known by the experts in the field). In the diagrams of FIG. 4 to FIG. 6, the current generator 60 defined by secondary winding T2 is assumed to supply load L through a bus capacitor $C_B$.

Both in the diagram of FIG. 5 and in the diagram of FIG. 6, reference 52 denotes an electronic switch, such as a mosfet.

On the other hand, reference 53 shows a comparator, e.g. of the hysteresis type (with value DV), connected in such a way as to activate (turn on) mosfet 52 above a voltage Vref, and as to turn mosfet 52 off below a voltage Vref-DV.

Focusing now on the diagram of FIG. 5, assuming mosfet 52 initially open (non conducting), the current through load L traverses diode D1, so as to charge a capacitor Cp3 via a resistor R3, adapted to represent parameters, even non ideal parameters, of capacitor (ESR).

The voltage across capacitor Cp3 (or across the serial connection between capacitor Cp3 and resistor R3) is sensed by comparator 53.

When this voltage reaches an upper reference level Vref, comparator 53 operates on mosfet 52 by closing it, which causes ("urges") capacitor Cp3 to connect with negative at ground level, so that part of the energy accumulated therein is transferred, through a diode D2 and a resistor R11, across capacitor Cp charged with a voltage V1.

Capacitor Cp3 actually charges capacitor Cp by rising the voltage thereof to a balance V2, so that capacitors Cp and Cp3 can now be considered as connected in parallel to an average voltage V2.

Now the auxiliary load R12 discharges both capacitors down to a lower reference voltage given by Vref-DV.

When sensing a voltage lower than its threshold (Vref-DV), comparator 53 opens electronic switch 52 again, so that capacitor Cp3 is again charged with current I.

Capacitor Cp is now alone, and discharges down to V1, while capacitor Cp3 charges again, in this way repeating the previously described cycle from the beginning.

The embodiments referred to in FIG. 5 provide a capacitor Cp3, traversed (at least partly) by the same current which flows through load L, so as to be charged.

When the charge level of such a capacitor reaches a given reference threshold level, a switch (mosfet) 52 is closed, so as to bring the charging voltage of capacitor Cp3 above the ground point, and to transfer the energy of such a capacitor to capacitor Cp, which has the auxiliary supply voltage.

In this way, the energy accumulated "floatingly" on capacitor Cp3, by having it traversed by the current flowing through load L, is made available on capacitor Cp as (positive) voltage referred to ground.

The embodiments referred to in FIG. 5 may be adapted to be used in conditions wherein the auxiliary current (i.e. the current used to charge capacitor Cp3) is lower than, or at most the same as, the current flowing through load L.

In case the need arises of a higher supply, it is possible to resort to an arrangement as depicted in FIG. 6, wherein parts or elements and components identical or equivalent to parts or components already described in connection with FIG. 5 are denoted by the same references.

In the case of FIG. 6, when electronic switch 52 is open, the current from load L is used to charge both capacitors Cp1 and Cp2 (via respective diodes D1, D3).

Comparator 53 once again senses the voltage across one of the capacitors (in the presently considered case, capacitor Cp2 or, more specifically, the voltage across the series connection of capacitor Cp2 and a resistor R3" associated therewith).

When such voltage reaches threshold level Vref set on comparator 53, the same comparator 53 operates on switch 52, making it conductive, and therefore bringing both capacitors Cp1 and Cp2 above the ground voltage level.

This produces a first current path, which from capacitor Cp1 goes through diode D2 and from it reaches capacitor Cp and then returns through diode D3. Another path is established from capacitor CP2, via diode D5, towards capacitor Cp, with a subsequent return through diode D7.

Once again, when the voltage across comparator 53 goes below the lower threshold level, comparator 53 acts again on switch 52, opening it and restoring the condition wherein capacitors Cp1 and Cp2 start accumulating energy again, in view of the following transfer towards capacitor Cp.

Substantially, the arrangement referred to in FIG. 6 involves the use of multiple charge accumulation cells, adapted to transfer the charge towards capacitor Cp.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electrical supply device, comprising:
   a transformer with a secondary winding configured to feed a current to a load;
   a control circuitry for the device;
   at least one electronic switch adapted to be alternately switched on and off on the basis of a control signal supplied by said control circuit;
   an auxiliary supply source configured for generating a stable supply voltage for said control circuit and comprising:
   at least one output capacitor configured to supply said stable supply voltage for said control circuit;
   at least one charge accumulation capacitor;
   a comparator sensitive to the voltage on said at least one charge accumulation capacitor; and
   a switch interposed between said at least one charge accumulation capacitor and said output capacitor, said switch coupled to said comparator, whereby when the voltage on said at least one charge accumulation capacitor is below a reference level; the current through said load traverses said at least one charge accumulation capacitor;
   and when the voltage on said at least one charge accumulation capacitor reaches a reference level, said switch couples said at least one charge accumulation capacitor to said output capacitor by transferring onto said output capacitor the charge on said at least one charge accumulation capacitor.

2. The device of claim 1, wherein said at least one charge accumulation capacitor is connected in series with said secondary winding.

3. The device of claim 1, wherein said switch acts between a ground of the device and a conducting plate of said at least one charge accumulation capacitor whereby, when on, said switch forces the charge on said at least one charge accumulation capacitor above a ground point in said device.

4. The device of claim 1, wherein said comparator is a comparator with hysteresis configured to turn said switch on and off for an upper and a lower level, respectively, of the voltage on said at least one charge accumulation capacitor.

5. The device of claim 1, wherein: a plurality of said charge accumulation capacitors are provided to be traversed by the current fed to said load;

said comparator is sensitive to the voltage on one of the charge accumulation capacitors of said plurality; said switch is interposed between said plurality of charge accumulation capacitors and said output capacitor, said switch coupled to said comparator whereby, when the voltage across said one of said charge accumulation capacitors of said plurality reaches the reference level, said switch couples said plurality of charge accumulation capacitors to said output capacitor by transferring onto said output capacitor the charge on said plurality of charge accumulation capacitors.

6. The device of claim 1, wherein said switch is an electronic switch.

7. The device of claim 6, wherein said switch is a metal oxide semiconductor field effect transistor.

8. The device of claim 1, wherein said load is a lighting source.

9. The device of claim 8, wherein said load is a light emitting diode lighting source.

* * * * *